Dec. 7, 1926. 1,609,354
J. C. HITCHNER
STOP MECHANISM AND REPEATING ATTACHMENT FOR TALKING MACHINES
Filed Dec. 28, 1921 3 Sheets-Sheet 3
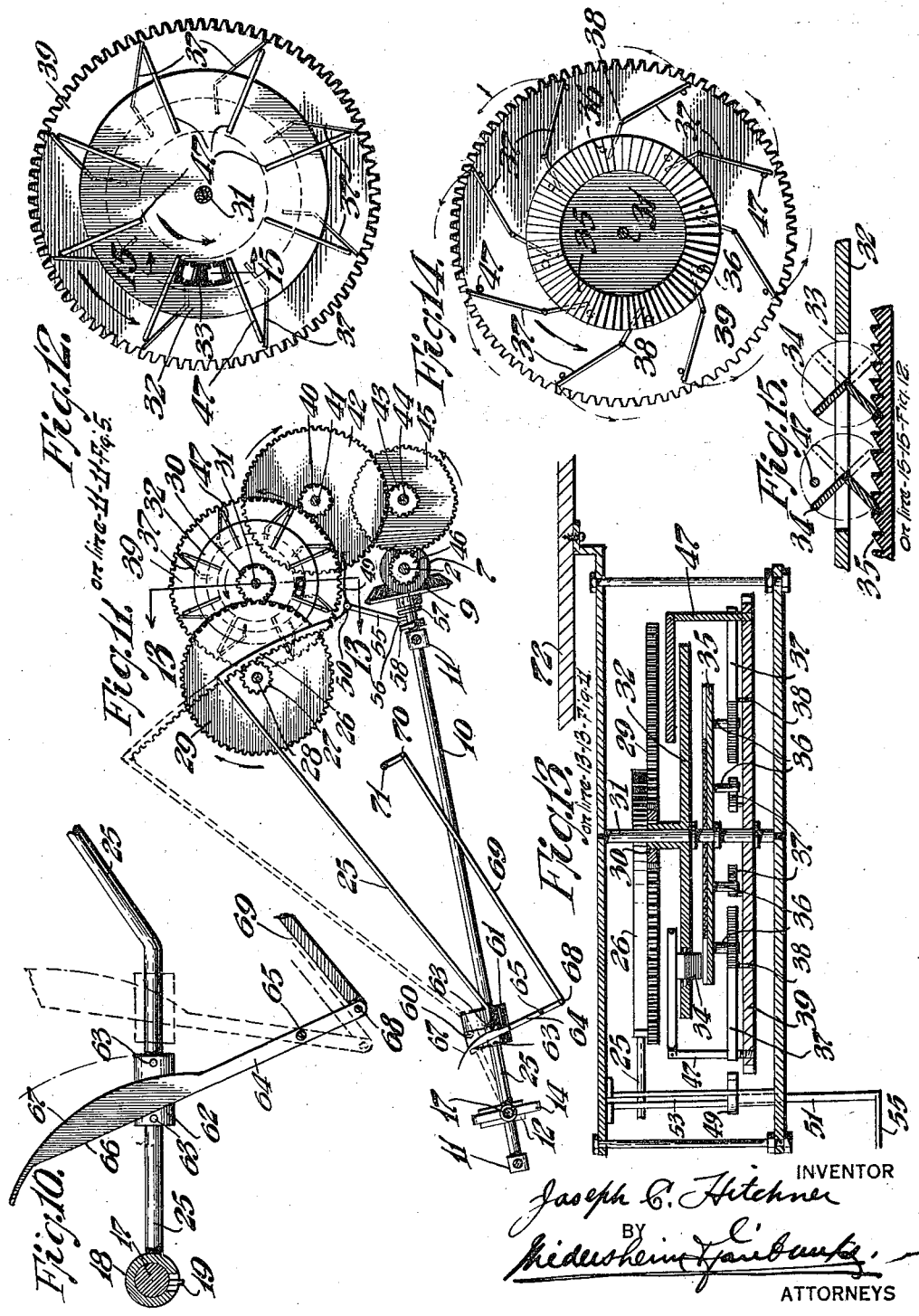
INVENTOR
Joseph C. Hitchner
BY
ATTORNEYS Patented Dec. 7, 1926.

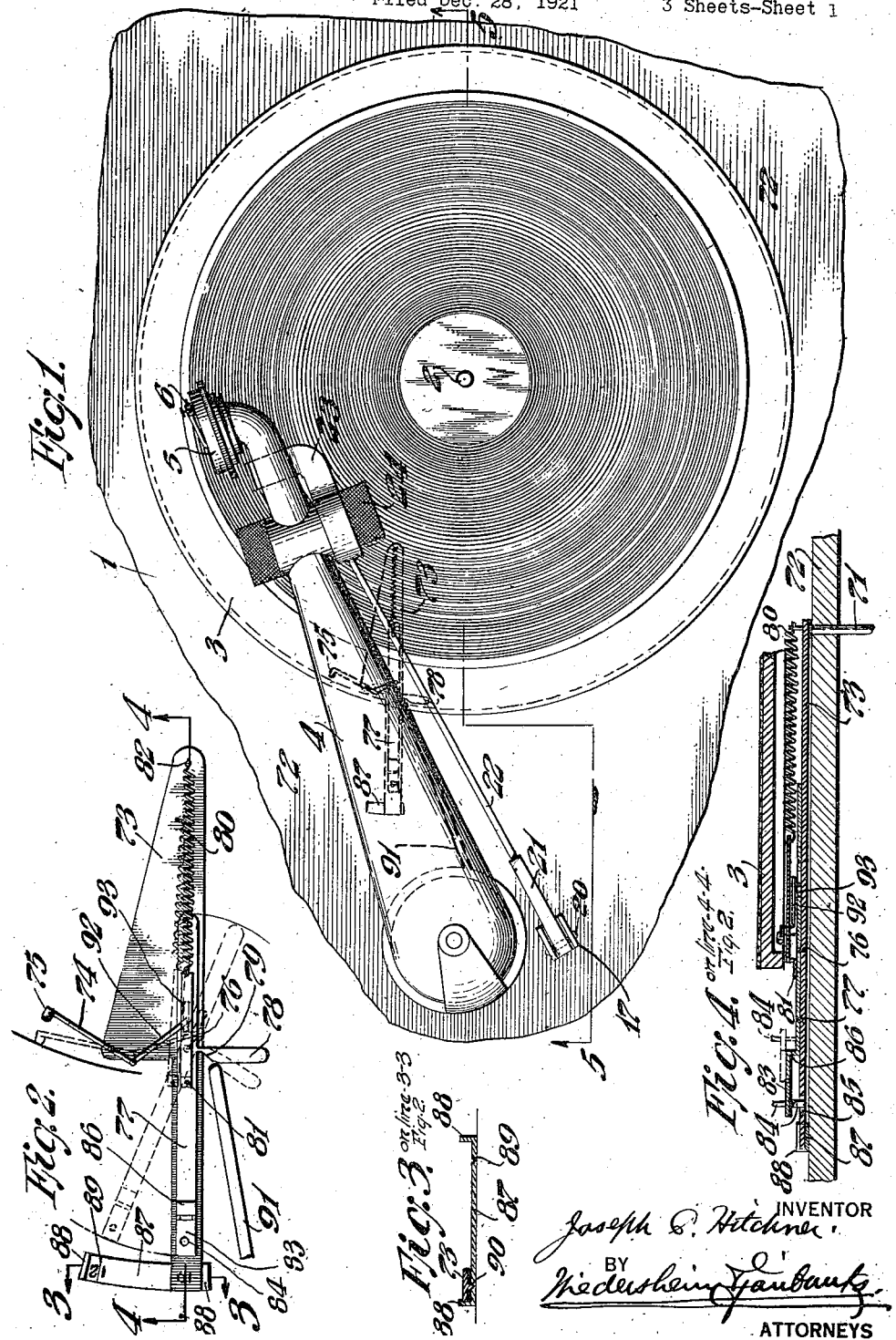

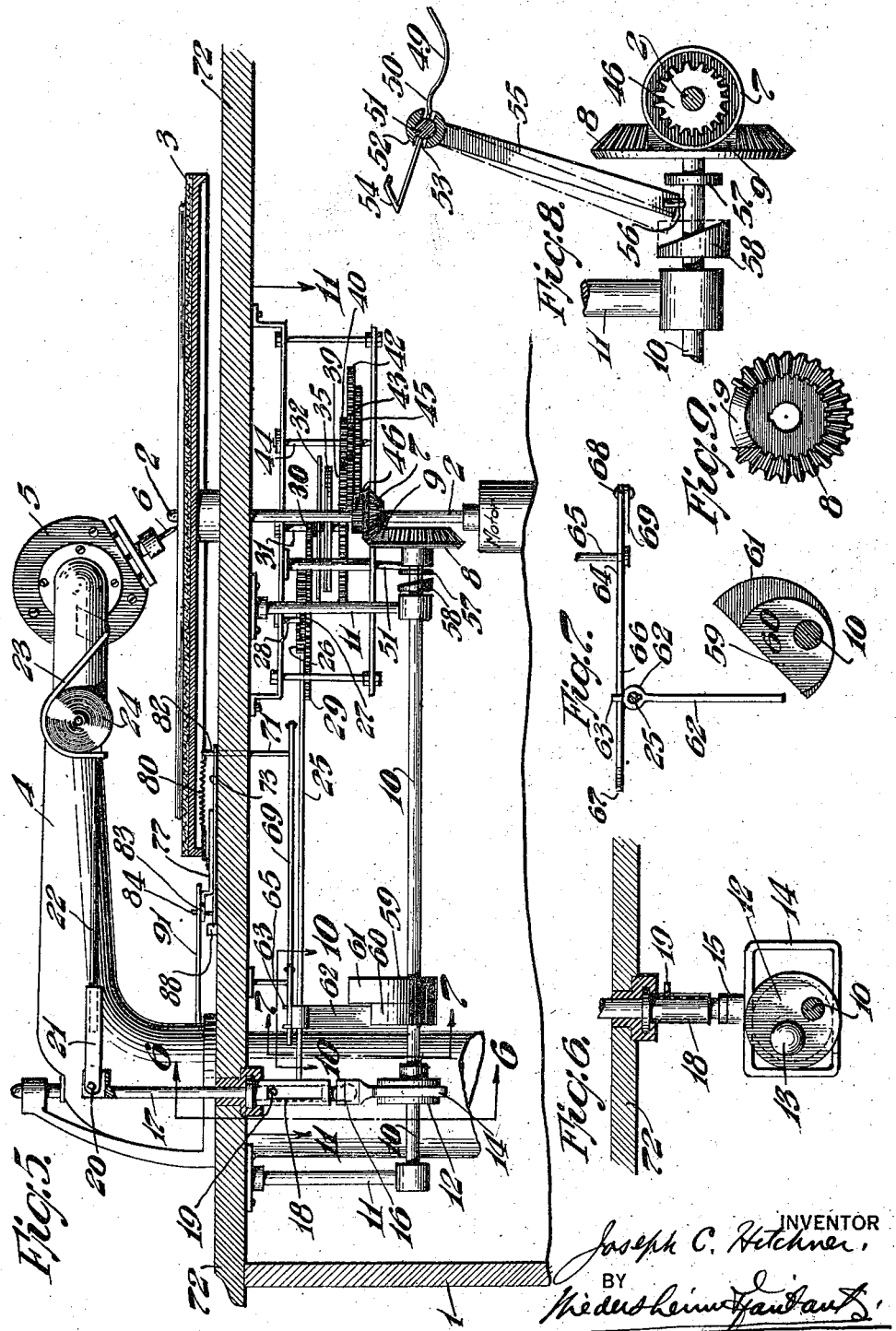

1,609,354

UNITED STATES PATENT OFFICE.

JOSEPH C. HITCHNER, OF PHILADELPHIA, PENNSYLVANIA, ASSIGNOR TO CHENEY TALKING MACHINE COMPANY, OF CHICAGO, ILLINOIS, A CORPORATION OF ILLINOIS.

STOP MECHANISM AND REPEATING ATTACHMENT FOR TALKING MACHINES.

Application filed December 28, 1921. Serial No. 525,307.

My present invention consists of a novel stop mechanism and repeating attachment for talking machines wherein the operations can be controlled in such a manner that after the playing of a selection the sound box will be raised from the record and the tone arm and sound box will be brought back to initial or starting position ready for playing the next selection and arrested in such position.

My device is also controlled in such a manner that if desired after a selection has been played the sound box is first raised from the record, the tone arm and sound box returned to initial or starting position and the sound box lowered to bring its stylus into contact with the record and the same selection is repeated as many times as may be desired.

My invention further comprehends novel means controlled by the movement of the tone arm for automatically controlling a novel construction and arrangement of a novel stop mechanism.

Numerous other novel features of construction and advantage will hereinafter more fully appear in the detailed description of the invention.

For the purpose of illustrating my invention, I have shown in the accompanying drawings a typical embodiment thereof which is at present preferred by me since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of a portion of a talking machine with a stop mechanism and repeating attachment, embodying my invention, combined therewith.

Figure 2 represents a top plan view of a portion of my device showing more particularly certain features of the stop mechanism and repeating attachment.

Figure 3 represents a section on line 3—3 of Figure 2.

Figure 4 represents a section on line 4—4 of Figure 2.

Figure 5 represents a section on line 5—5 of Figure 1.

Figure 6 represents a section on line 6—6 of Figure 5.

Figure 7 represents a section on line 7—7 of Figure 5.

Figure 8 represents, on an enlarged scale, certain features seen in Figure 5.

Figure 9 represents, in side elevation, a gear employed.

Figure 10 represents a section on line 10—10 of Figure 5.

Figure 11 represents a section on line 11—11 of Figure 5.

Figure 12 represents a top plan view of a portion of the mechanism in detached position.

Figure 13 represents a section on line 13—13 of Figure 11.

Figure 14 represents a top plan view of a ratchet gear and certain of its adjuncts, the shaft on which they are mounted being shown in section.

Figure 15 represents a section on line 15—15 of Figure 12.

Similar numerals of reference indicate corresponding parts.

Referring to the drawings:

In accordance with my present invention the tone arm automatically sets into operation upon the completion of the playing operation, the mechanism driven by the turntable shaft effecting the raising of the stylus from the record, the return of the tone arm and sound box to starting position and arresting them in such position, and at the same time arresting the rotation of the turntable. By the adjustment of a controlling member the stop mechanism may be rendered inoperative in which case the same selection is replayed any desired number of times.

1 designates a talking machine of any desired or conventional type, which is provided with the usual motor driven turntable shaft 2, turntable 3, tone arm 4 and sound box 5 which is movably connected with the tone arm 4 in any desired manner in order that at the proper time the stylus 6 may be raised above the record or lowered into contact therewith.

*Mechanism for raising the sound box from the record and returning it to its starting position.*

The shaft 2 has mounted thereon a bevel gear 7 which at the proper time meshes with the teeth of the mutilated gear 8, said gear 8 being provided with a dwell 9, see Figures 5 and 9. The gear 8 is fixed to a shaft 10 journalled in brackets 11. The shaft 10 has fixed to it an eccentric 12 which is weighted, as at 13, see Figure 6. Surrounding the eccentric 12 is a strap 14 preferably rectangular in contour and having a recessed sectional boss 15 at its upper end which receives the ball shaped end 16 of a rod 17, which latter is journalled in a rotatably mounted slotted sleeve 18. A pin 19 extends through the slot in the sleeve 18 and into the rod 17. The rod 17 at its upper end is pivotally connected, at 20, to a bar 21 to which is connected a rod 22 which at its forward end is connected to a controlling member 23, the inner end portion of which is substantially U-shaped to partially surround the neck 24 of the tone arm and to extend beneath the forward portion of the neck 24 which carries the sound box and which is movably connected with the body portion of the tone arm.

The sleeve 18 has extending from it a rod 25, see Figure 5, which terminates at its forward end in a curved rack bar 26. This rack bar meshes with a pinion 27 fixed to a shaft 28 mounted to revolve in suitable bearings. The shaft 28 also has fixed to it a gear 29 which meshes with a pinion 30 loosely mounted on the shaft 31 suitably journalled in the framework of the machine.

The pinion 30 is fixed to a disc 32 which is loosely mounted on a shaft 31. The disc 32 has an aperture 33 in which are movably mounted pawls 34, see Figure 15. The pawls 34 are adapted to co-operate with the teeth of a circular rack 35 which is loosely mounted on the shaft 31. The rack 35 carries the stop pins 36 which are circumferentially spaced from each other and depend from the rack 35 in the path of the levers 37, which are fulcrumed at 38 to a gear 39 which meshes with a pinion 40 fixed to a shaft 41, suitably journalled, and to the shaft is also fixed a gear 42 which meshes with a pinion 43 fixed to a shaft 44 suitably journalled. Also fixed to the shaft 44 is a gear 45 which meshes with a pinion 46 on the turntable shaft 2.

The gear 39 carries the L-shaped detent arms 47 which overhang the disc 32 in the path of the pawls 34. The free ends of the levers 37 when thrown outwardly, as indicated by the broken arcs in Figure 14, travel in the path of the arm 49 of a lever 50, see Figures 8 and 11, which passes through a rod 51 which is journalled in a stationary sleeve 52 slotted as at 53, said rod 51 having limited movement in said slot. The lever 59 has one end rearwardly inclined, as at 54, so that it will engage the levers 37 at the proper time and return them to their initial position, seen in full lines Figure 14. The rod 51 has its terminal flattened to form a bar or plate 55, the free end of which is in the path at certain times of a pin 56 fixed to the shaft 10. On one side of this pin 56, a collar 57 is secured to the shaft 10, and, on the opposite side of the pin 56, a cam 58 is secured to the shaft 10, see more particularly Figure 8. The shaft 10 has also fixed to it a cam 59, see Figures 5 and 7, having a cam face 60 for a ten inch record and a cam face 61 for a twelve inch record. These cams are adapted to co-operate with a blade 62 which is keyed to the rod 25. The blade 62 has extending from its upper end the pins 63.

64 designates a lever, see Figures 10 and 11, which is fulcrumed at 65 to a stationary portion of the machine. The forward end of the lever 64 extends between the pins 63 and has one side substantially straight, as at 66, and the opposite side curved, as at 67. The lever 64 is pivotally connected at 68 with a link 69, see Figure 11, which is pivotally connected at 70 with the deflected end of a rod 71, which latter is journalled in the table 72 of the machine. The rod 71 is fixed to a plate 73 of the stop mechanism, and this plate 73 has pivoted to it the brake lever 74, the outer end 75 of which forms a friction member adapted to engage the inner face of the depending flange of the turntable 3.

The plate 73 has pivotally connected to it at 76 a T-shaped lever 77, see Figure 2, the tail piece 78 of which is provided with a recess 79 in proximity to the body portion of such lever. 80 designates a spring which is operatively connected at 81 to the lever 77 on one side of its fulcrum, and on the opposite side of such fulcrum it is connected at 82 to the plate 73. The end of the lever 77 has hinged to it a locking member 83, see also Figure 4, having a pin 84 extending through it, the lower end of which for repeating a selection is received in the recess 85 in the plate 73, see more particularly Figure 4. The lever 77 is off-set, as at 86, so that this locking member 83 can be thrown over into the position seen in dotted lines in Figure 4 when the same selection is not to be replayed. The forward end of the plate 73 travels over an indicator 87 consisting of a plate having its free ends upwardly deflected to form stops 88. This plate 87 is provided with the notches 89 adapted to receive the projection 90 on the under face of the forward end of the plate 73, see more particularly Figure 3.

91 designates an arm which is fixed to the tone arm to move in unison with it, and this arm is adapted, if desired, to automatically control the lever 77.

In the operation, assuming that a record is on the turntable and the playing stylus is in the stylus chuck of the sound box, the machine is ready for operation.

Assuming now that it is desired to automatically stop the machine at the end of the playing operation, it will be understood that in accordance with my present invention the sound box travels inwardly to the last impression groove of the record, is then automatically raised from the record, returns to its starting position, seen in Figure 1, and stopped and retained in such starting position.

The operator first swings the controlling plate 83 into the position seen in Figure 4, and then, in the usual manner, lowers the sound box until its stylus engages the blank space at the outer peripheral portion of the record. Assuming that the turntable is rotating, the stylus will travel in the usual manner toward the central portion of the record and into the annular groove ordinarily provided at the central portion of the record at the end of the record impression groove. As the tone arm and sound box move inwardly toward the center of the record, it will be apparent that the rod 22, see Figure 5, the rod 17 and the sleeve 18 will be turned, and since the sleeve 18 has connected to it the rod 25, the rod 25 will be swung inwardly. This will cause the rack 26 at the free end of the rod 25, see more particularly Figure 11, to move inwardly and rotate the pinion 27 and the gear 29 and thereby the pinion 30 which is connected to the disc 32, so that said disc is being rotated in the direction of the arrow seen in Figure 12.

It will be understood from Figure 11, see also Figure 5, that the pinion 46 on the turntable shaft 2 is, during the revolution of the turntable shaft 2, effecting the rotation of the gear 39 through the pinion 46, gear 45, pinion 43, gear 42 and pinion 40, so that the gear 39 is rotating in the same direction as the disc 32 but at a slower speed of revolution. When the inward movement of the sound box 5 towards the axis of rotation of the record is arrested due to the stylus travelling in the concentric groove, the inward movement of the rod 25 is arrested, thereby arresting the rotation of the pinion 27, gear 29 and pinion 30, and since this pinion 30 is connected to travel in unison with the disc 32, the disc 32 will stop, while the gear 39 beneath it will continue to rotate.

The pawls 34 ride over the teeth of the ratchet 35, but, as soon as the disc 32 stops, the rotation of the ratchet 35 is stopped, and since the gear 39 continues to revolve, the levers 37 will be thrown out by the stop pins 36 in the direction shown by the arrows at the periphery of the gear 39, see Figure 14. When these levers 37 are thrown out in the manner described, they engage the detent lever 50 to release the arm 55 from the stop 56 on the shaft 10. The weight 13 on the eccentric 12 will overbalance the shaft 10 so that it will rotate sufficiently for the teeth of the gear 8 to come into mesh with the gear 7, so that substantially one revolution will be imparted to the shaft 10. The cam 58 moves the arm 55 into the path of the stop 56, so that only one revolution of the shaft 10 is permitted. As the shaft 10 revolves, the eccentric 12 drawing downwardly on the rod 17 will cause the member 23 to raise the sound box 5 so that the stylus 6 is disengaged from the record. At this time or prior thereto, the stop members 47 on the gear 39 will engage the pawls 34 and disengage them from the rack 35. The shaft 10 continues to revolve and the cam 59 is so timed that it will at this time act against the plate 62 which is longitudinally slidable on the rod 25 but does not rotate on it. It will thus be seen that the cam 59 will swing the rod 25 towards the left, thereby returning the rack 26 to the position seen in dotted line in Figure 11, and, since this rod 25 is connected to the sleeve 18, the rod 22 and the tone arm 4 will be returned to the initial or starting position of the sound box, so that the stylus will be positioned above the blank space at the beginning of the record.

At this time, the arm 91 carried by the tone arm will contact with the stop arm 77, thereby moving it on its fulcrum, so that the brake lever 74 will be applied to the turntable and arrest its rotation, since the link 92 connected with such lever has a deflected end which extends into a slot 93 in the stop arm 77.

During this operation, it will be understood that the hinged plate 83, see Figure 4, is in the position seen in dotted lines in Figure 4. If, now, it is desired to have the playing of the same record repeated, instead of having it stop, the hinged plate 83 is thrown into position seen in full lines in Figure 4 at which time the pin 84 interlocks with the recess 85 so that the stop arm 77 is locked with respect to the brake arm 73.

Assuming now that the operation before described has taken place, it will be apparent that when the arm 91 comes into contact with the arm 77, it will simply press against it since it cannot swing the lever 77 into position to throw on the brake. If the brake is not applied, the eccentric 12 during its revolution will cause the rod 17 to move upwardly thereby permitting the sound box to swing downwardly, and the stylus 6 comes into engagement with the record. The replaying of the record will be repeated as before described. This replaying of the record will continue until the hinged plate 83 is thrown into the position seen in dotted lines in Figure 4.

It will be apparent that the brake arm 73 when moved into position for a ten inch or twelve inch record will rock the lever 64 in a direction to move the blade 62 into the corresponding position for either a ten or a twelve inch record, so that the proper throw will be imparted to the tone arm 4 to position the stylus in starting position to play a ten or a twelve inch record.

As the lever 37 strikes the lever 50 to swing the stop arm 55 into the position seen in dotted lines in Figure 8, it will be apparent that the deflected end 54 of the lever 50 will be in the path of the next lever 37, thereby causing all of the levers 37 to be returned to their normal position against their stop 47, which will cause the rack 35 to be arrested, since the stops 47 will lock the pawl 34 against the rack 35.

It will be apparent that in accordance with my present invention irrespective of the diameter of the record or of its impression groove, the stylus and sound box will be automatically raised when the stylus reaches the last impression groove of the record, the tone arm and sound box will be returned to starting position, and if the machine, for example, has been set for a twelve inch record, it will return to the starting position for a twelve inch record or if it has been set for the starting position of a ten inch record it will be returned to the starting position for a ten inch record, that is, in any case it will return to the starting position for the record for which it has been set unless the construction has been set for repeating, in which case it will return to its proper position for either a ten or a twelve inch record.

When the sound box is lowered into playing position for either a ten or a twelve inch record, the brake is automatically released by the slight lateral movement of the tone arm so that it is not necessary to manually operate the brake except by the movement of the tone arm, and this is only done when the mechanism is not set for repeating and requires the manual movement of the sound box to bring the stylus into playing engagement with the record.

It will now be apparent that I have devised a new and useful stop mechanism and repeating attachment for talking machines which embodies the features of advantage enumerated as desirable in the statement of the invention and the above description, and while I have, in the present instance, shown and described an embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a device of the character described, the turntable shaft, the turntable, the tone arm and the sound box movably connected with it, a member positioned by said tone arm when the stylus reaches the final impression groove of the record, a trip controlled by said member, and means controlled by said trip and actuated by said turntable shaft to progressively raise the sound box above the record, return it to its starting position and retain it in its starting position.

2. In a device of the character described, the turntable shaft, the turntable, the tone arm and the sound box movably connected with it, a member positioned by said tone arm when the stylus reaches the final impression groove of the record, a trip controlled by said member, and means actuated by said turntable shaft and controlled by said trip to progressively raise the sound box above the record, return the tone arm and sound box to starting position and then lower the sound box into playing engagement with the record.

3. In a device of the character described, the turntable shaft, the turntable, the tone arm and the sound box movably connected with it, a trip automatically controlled by the tone arm when the stylus reaches the final impression groove of the record, means actuated by said trip to raise the sound box above the record and return the tone arm and sound box to a starting position, and stop mechanism co-operating with the turntable and actuated by said means to arrest the rotation of the turntable when the tone arm and sound box are returned to starting position.

4. In a device of the character described, the turntable shaft, the turntable, stop mechanism for the turntable, and controlling devices for the stop mechanism actuated by the tone arm and in turn controlled by said stop mechanism to effect the return of the tone arm to its initial position when a selection has been played and automatically position it in starting position for either a ten or a twelve inch record.

5. In a device of the character described, the turntable, the tone arm and the sound box movably connected with it, means controlled by the normal sound impression groove of the record to automatically effect the raising of the sound box to bring its stylus out of playing engagement with the record, the return of the tone arm and sound box to their starting position and automatically stop them in starting position with the stylus of the sound box out of playing engagement with the record, said means also effecting the stopping of the turntable, said turntable being started by a lateral movement of the tone arm, manually effected.

6. In a device of the character described, the tone arm, the sound box movably connected with it, the turntable, the motor driven turntable shaft, an arm movable in unison with the tone arm, a rack positioned by said arm, a disc adjustably positioned by said rack, trip members controlled by said disc, a trip actuated by said trip members, a second shaft controlled by said trip to operatively connect it with the turntable shaft, and means actuated by said second shaft to effect the raising of the sound box out of engagement with the record, the returning of the sound box to starting position and the retention of it in starting position.

7. In a device of the character described, the tone arm, the sound box movably connected with it, the turntable and the turntable shaft, a disc operatively connected with the tone arm to be rotated during the lateral movement of the tone arm and to have its rotation arrested when the stylus reaches the final impression groove of the record, a trip controlled by said disc, a shaft controlled by said trip to be operatively driven by the turntable shaft when released, means actuated by said trip controlled shaft to return the tone arm and sound box to starting position and means to automatically stop the turntable as the tone arm and sound box return to starting position.

8. In a device of the character described, the tone arm, the sound box, the turntable, the turntable shaft, a member positioned by said tone arm when the stylus reaches the final impression groove of the record, a trip controlled by said member, a gear on said turntable shaft, a mutilated gear to mesh with said gear, a counterbalance shaft carrying said mutilated gear and controlled by said trip, means actuated by said counterbalance shaft to raise the sound box to move its stylus out of engagement with the record, to then return the tone arm and sound box to starting position and retain them in such position, and means to stop the rotation of the turntable.

9. In a device of the character described, the tone arm, the sound box movably connected with it, the turntable, the turntable shaft, a member positioned by said tonearm and arrested when the stylus reaches the final impression groove of the record, a rack controlled by said member, a gear driven by said turntable shaft, levers on said gear controlled by said rack, a trip in the path of said levers, means actuated by said trip and driven from said turntable shaft to raise the sound box, return it to starting position, and retain it in starting position and means to stop the rotation of the turntable.

JOSEPH C. HITCHNER.